United States Patent
Offenbroich

(10) Patent No.: US 7,357,592 B2
(45) Date of Patent: Apr. 15, 2008

(54) CLAMPING JOINT SYSTEM

(75) Inventor: Adrian Offenbroich, Düsseldorf (DE)

(73) Assignee: Hestex Systems B.V (NL)

( * ) Notice: Subject to any disclaimer, the term of this patent is extended or adjusted under 35 U.S.C. 154(b) by 0 days.

(21) Appl. No.: 11/250,152

(22) Filed: Oct. 13, 2005

(65) Prior Publication Data
US 2007/0086853 A1 Apr. 19, 2007

(51) Int. Cl.
*F16B 9/00* (2006.01)
(52) U.S. Cl. .................. 403/252; 403/255; 403/322.3; 403/257
(58) Field of Classification Search ................ 403/314, 403/350, 367, 78, 264, 252, 254, 255, 256, 403/257, 320, 217, 409.1, 109.5, 374.1, 322.3
See application file for complete search history.

(56) References Cited

U.S. PATENT DOCUMENTS

| | | | | |
|---|---|---|---|---|
| 4,455,103 A | * | 6/1984 | Hackenberg | 403/190 |
| 4,690,582 A | * | 9/1987 | Maier et al. | 403/252 |
| 4,799,819 A | * | 1/1989 | Swoboda | 403/252 |
| 5,127,761 A | * | 7/1992 | Vieler | 403/252 |
| 5,143,474 A | * | 9/1992 | Vieler | 403/252 |
| 5,647,682 A | * | 7/1997 | Riehm | 403/297 |
| 6,106,183 A | * | 8/2000 | Strassle et al. | 403/252 |

FOREIGN PATENT DOCUMENTS

| | | |
|---|---|---|
| DE | 42 39 199 A1 | 5/1994 |
| DE | 198 17 427 A1 | 10/1999 |
| EP | 1 234 985 A2 | 2/2002 |

\* cited by examiner

*Primary Examiner*—Katherine Mitchell
*Assistant Examiner*—Daniel J. Mills
(74) *Attorney, Agent, or Firm*—Harness, Dickey & Pierce, P.L.C.

(57) ABSTRACT

A clamping joint system is provided for the detachable junction of two elements, of which at least one comprises an undercut longitudinal slot and the other one (12) comprises a receiving space (14) formed therein. The clamping joint system comprises a clamping element (18), which can be inserted into the receiving space (14). The clamping element comprises a housing (42) and anchor elements (22), which can be clamped against the undercut of the longitudinal slot by actuating an actuation member (19). One outer surface of the housing (42) of the clamping element (18) has an elevation (55). The elevation is formed such that it provides a tolerance compensation between the housing (42) and a surface of the receiving space (14) of element (12), when the clamping element (18) is inserted in the receiving space (14).

18 Claims, 5 Drawing Sheets

Fig. 3
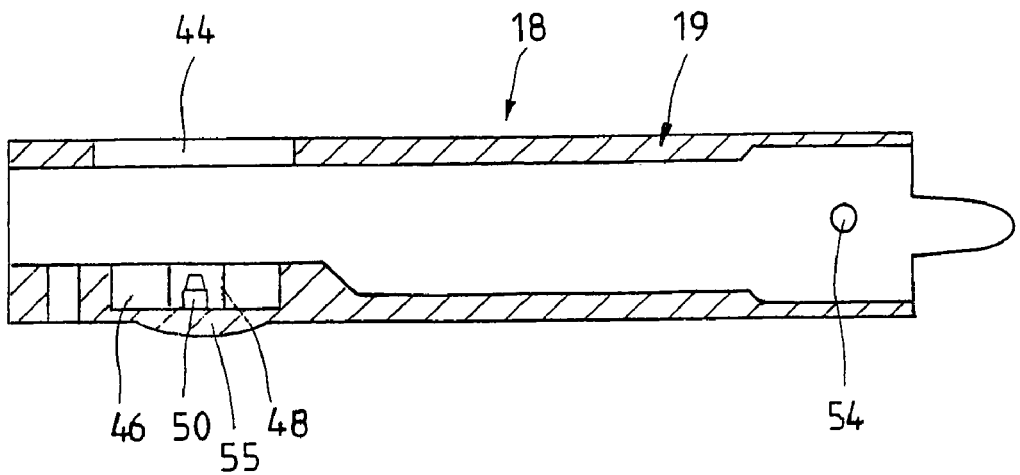
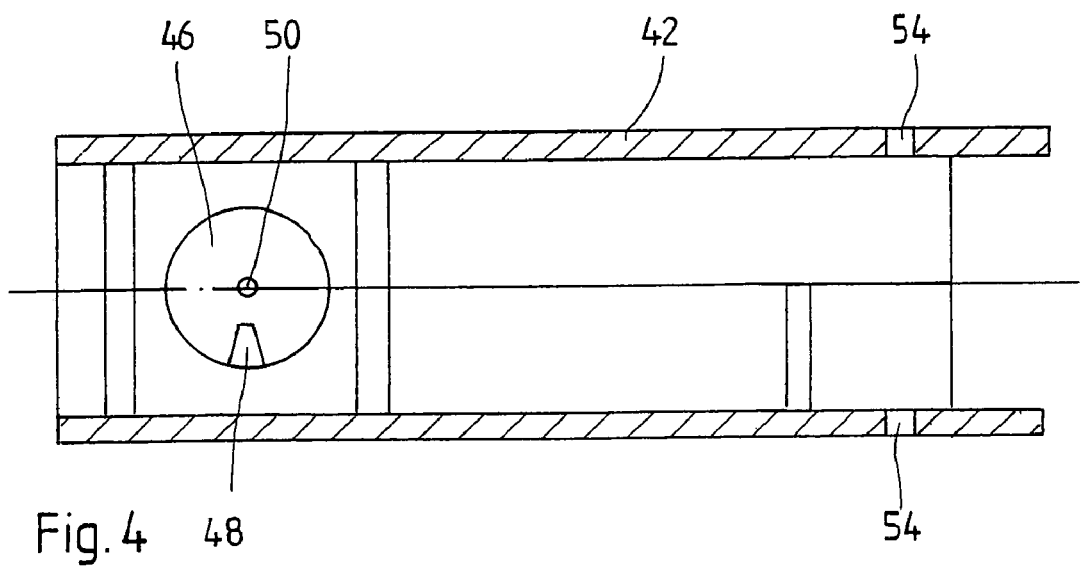
Fig. 4
Fig. 5
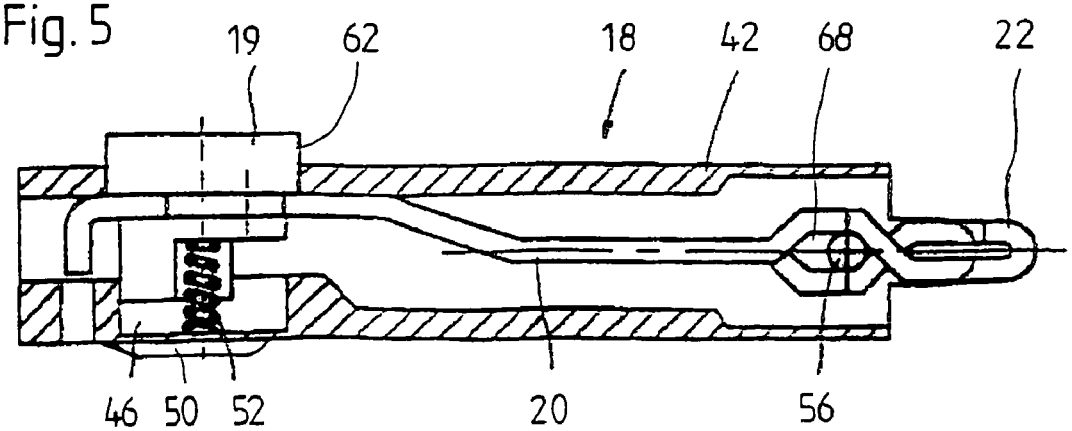

CLAMPING JOINT SYSTEM

BACKGROUND

1. Field of Invention

The invention relates to a clamping joint system for detachably connecting two elements, of which at least one comprises an undercut longitudinal groove and the other one comprises a receiving space formed therein, comprising a clamping element, which can be inserted into the receiving space, be clamped in the longitudinal slot and which comprises anchor elements, which can be clamped against the undercut of the longitudinal groove by actuating an actuation member.

2. Discussion

Such clamping joint systems are for example used in building up shelf systems, fair structures and the like. Herein, individual elements are joined with a rapid junction technique by means of clamping joint systems, such that a quick mounting and dismounting of the shelf system, the fair structures or the like is possible. For this, a quick and simple handling of the clamping joint system is advantageous.

A high number of clamping joint systems, which meet these requirements, are known. Thus, DE 42 39 199 A1 for example shows a clamping joint, by means of which two profile elements, of which at least one comprises an undercut longitudinal slot and the other one comprises a rectangular hollow section, can be connected to each other. The profile elements shown in this document are obviously metal or plastic profiles, wherein usually extruded metal or aluminium profiles are used in the field of fair building. A support member, which comprises a housing and in which a holding element in form of a leaf spring comprising formed elements for engagement into an undercut longitudinal slot of an adjacent profile, which holding element can be actuated by a cam, is inserted in the hollow section of the one profile.

DE 198 17 427 A1 shows a clamping joint, in which a hook element can be actuated by means of an eccentric screw or a countersunk head bolt for engaging in an undercut longitudinal slot of a profile element. Herein, the clamping joint itself is inserted in a case-like hollow section of a second profile element. The clamping joint is held in this hollow section in that an insertion tower of the screw engages in an opening formed in the profile element.

Furthermore, EP 1 234 985 A2 describes a clamping joint system for the detachable junction of two elements, of which at least one comprises an undercut longitudinal slot and the other one comprises a receiving space formed therein, comprising a clamping element, which can be inserted into the receiving space, be clamped in the longitudinal slot and which comprises anchor elements, which can be clamped against the undercut of the longitudinal slot by actuating an actuation member. The clamping joint system comprises an adapter element for receiving the clamping element, wherein the adapter element, which has received the clamping element, can be inserted into the receiving space. The clamping element and the adapter element can be joined to each other with positive fit and for this purpose corresponding junction structures are respectively formed at these elements, wherein snap-in cams are formed at the clamping element as junction structures and corresponding recesses, which cooperate with the snap-in cams, are formed at the adapter element. The clamping element comprises a housing and the snap-in cams are formed by sections, which project over the housing, of a guiding and expanding pin, which is placed in a transverse direction to the housing and which traverses the housing on two sides, for a leaf spring element that is placed in the housing and comprises the anchor elements. The respectively corresponding junction structures, which consist of snap-in cams at the clamping element and of recesses provided at the adapter element, hold the clamping element safely in the adapter element, such that the clamping element cannot work loose unvoluntarily from the adapter element, but these junction structures are not able to prevent a certain play of the clamping element in the mounted state, so that the clamping element can move relatively to the adapter element in the receiving space.

Based upon this state of the art, it is an object of the present invention to provide a clamping joint system of the initially mentioned type, which assures a safe fixation of the clamping element in the receiving space and efficiently minimizes the freedom of motion of the clamping element in the receiving space.

The clamping joint system according to the present invention for the detachably connecting two elements, of which at least one comprises an undercut longitudinal groove and the other one comprises a receiving space formed therein, comprises a clamping element, which can be inserted into the receiving space and which comprises a housing and anchor elements, which can be clamped against the undercut of the longitudinal groove by actuating an actuation member. According to the invention, an outer surface of the clamping element housing comprises an elevation, which is formed such that it provides a tolerance compensation between the clamping element housing and a surface of the element comprising the receiving space, when the clamping element is inserted in the receiving space, in order to assure that the housing of the, clamping element and the actuation member, which is inserted in the housing, are correctly positioned with respect to each other. In this way, a wrong alignment of the clamping element with the actuation member can be prevented, so that the actuation member can always be inserted into the clamping element without any problems and can correspondingly be actuated without any problems.

Preferably, the elevation is placed in the proximity of the actuation member in the assembled state of the clamping joint system. In this way, an optimum function of the elevation is assured. Herein, the elevation preferably projects less than about 3.5 mm. On the one hand, this is sufficient for assuring a correct function; on the other hand, the mounting of the clamping element in the receiving space is not unnecessarily impeded.

Furthermore, another advantageous embodiment of the invention proposes that the clamping joint system comprises a leaf spring element placed in a housing of the clamping element, which leaf spring element has an opening, through which the actuation member is passed, wherein the opening comprises, along the periphery thereof, at least one shoulder, which differs from the regular contour.

The actuation member preferably comprises an eccentric, which, when the leaf spring element and the actuation member are mounted, cooperates with the edge of the opening of the leaf spring element, if the actuation member makes a rotational movement, in order to clamp the anchor elements in the longitudinal slot in this way.

The opening of the leaf spring element preferably comprises, along the periphery thereof, several shoulders differing from the regular circular contour, which cut the circular contour in form of secants, such that support areas for the eccentric of the actuation member are formed, which prevent turning of the leaf spring element inside the clamping element during actuation of the actuation member.

The actuation member advantageously comprises a structure, which essentially corresponds to the shoulder, at a portion that has to be passed through the opening. In this way, the actuation member can be arrested at the leaf spring element after its insertion by means of a slight rotation of the actuation member.

A stop is preferably provided at the clamping element, which stop cooperates with a shoulder of the actuation member serving as stop, and which limits the rotation of the actuation member in both directions. Thus, a defined actuation of the actuation member is assured.

In a respective stop position of the actuation member, the cooperating stop faces of the stop and of the shoulder of the actuation element serving as stop are preferably formed such that they are essentially facing each other in parallel and dash against each other in a correspondingly plane way, whereby the functioning of the actuation member is improved and the wear of the stop faces is reduced.

Furthermore, the actuation member is advantageously spring-weighed by a spring element in such a way that one portion of the actuation member projects beyond the housing of the clamping element, wherein the actuation member can be immersed in the housing by pushing it inwards against the spring resistance, such that the clamping element with the adapter element mounted thereon can be inserted into the receiving space and joined by means of the spring-weighed actuation member, which snaps in a corresponding opening in the receiving space with its portion that projects beyond the housing. During such a pressing in, the actuation member having a shoulder edge leans with this edge on a shoulder, which is formed in the opening of the leaf spring element. On the one hand, this causes the leaf spring element to follow the motion and not to work loose from the eccentric at the actuation member. On the other hand, a tilting motion of the actuation member is prevented.

The spring element is preferably held at a spring element holding device provided at the clamping element, which holding device can have the form of a spring thorn or can be alternatively a cylinder, which surrounds the spring element in form of a corresponding recess in the actuation member. The spring element holding device supports the spring element in the actuation member, in order to facilitate the installation of the actuation member and to prevent a bending in the wrong direction of the spring element.

BRIEF DESCRIPTION OF THE DRAWINGS

Other characteristics and advantages of the invention will appear from the following description of an exemplary embodiment with reference to the annexed drawing. Herein:

FIG. 3 shows a cut side view of a clamping element of the clamping joint system according to the invention of FIG. 1;

FIG. 4 shows a cut plan view of the clamping element represented in FIG. 3;

FIG. 5 shows the clamping element of FIG. 3 with inserted leaf spring element and actuation member according to FIG. 1;

DESCRIPTION OF THE PREFERRED EMBODIMENTS

Figure 1:
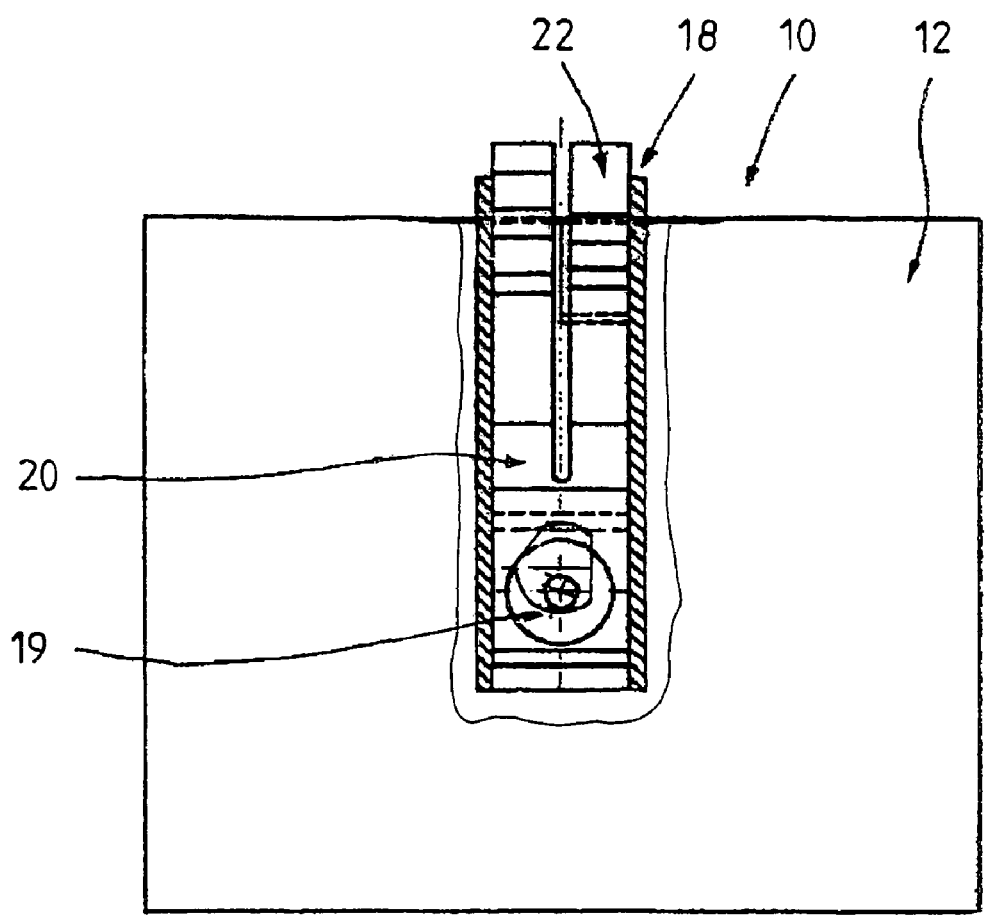
FIG. 1 shows a partially cut plan view of a clamping joint system according to the invention, which is integrated in a plate shaped element, which shall be joined to another non represented element.

In the figures, the same reference numerals indicate components of the same kind. The exemplary embodiment, which is explained in the following with reference to the figures, serves for description and is not limiting. The special design of the clamping element is in particular only a possible design, which can be used according to the present invention. However, it should be understood that also designs differing from this embodiment are possible.

FIG. 1 is a partially cut plan view, which represents a clamping joint system 10 according to the invention, which is placed in a receiving space 14 of en element 12 to be joined. The clamping joint system 10 comprises a clamping element 18, which is immersed and held with positive as well as non-positive fit in the receiving space 14 of element 12, which will be described in more detail in the following. Clamping element 18 comprises a leaf spring element 20, which can be actuated by an actuation member 19, and at which anchor elements 22 are formed that project beyond a front of clamping element 18. During the junction of the represented element 12 with a no further represented element, these anchor elements 22 are introduced into an undercut longitudinal groove of the second element, in order be clamped in this longitudinal groove by generating a tensile force by means of actuation member 19.

The detailed structure of clamping element 18 is explained in more detail with reference to FIGS. 3 through 6.

Figure 2:
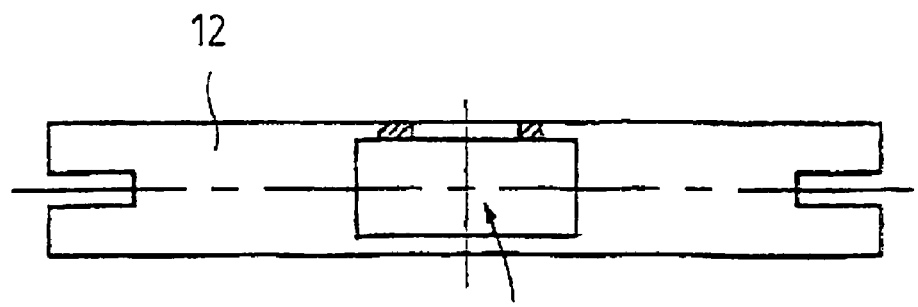
FIG. 2 shows a side view of a plate shaped element having a receiving space formed therein for receiving a clamping joint system according to the invention.

FIG. 2 shows a side view of a plate shaped element 12 with receiving space 14 formed therein. Receiving space 14 is formed as a recess, which is open on one side and in which clamping joint system 10 can be immersed.

Clamping element 18 is represented in more detail in FIGS. 3 and 4, wherein FIG. 3 is a cut side view and FIG. 4 is a cut plan view of clamping element 18. Clamping element 18 comprises a housing 42, in which leaf spring element 20 represented in FIG. 1 as well as actuation member 19 shall be received, which is described in more detail with reference to FIG. 5. Housing 42 comprises a circular housing opening 44 and a circular cavity 46, which is provided in the interior of housing 42 opposite housing opening 44, which both correspondingly serve for guiding through and receiving actuation member 19. In cavity 46, an essentially wedge-shaped stop 48 is arranged, which limits a rotation of actuation member 19 in both directions. Furthermore, a spring thorn 50 for receiving a spring element 52 is centrally positioned in cavity 46, which spring element is represented in detail in FIG. 5. Spring thorn 50 serves for supporting spring element 52, in order to facilitate the installation of actuation member 19 and to prevent a bending in the wrong direction of spring element 52. Furthermore, through holes 54 opposed to each other for receiving a guiding and expanding pin 56, which is also shown in FIG. 5, are provided in the side walls of housing 42. Beneath cavity 46, the housing comprises an elevation 55, which projects outwards. This elevation 55 serves for providing a tolerance compensation between housing 42 and a surface of receiving space 14 of element 12, in order to prevent housing 42 and actuation member 19 from getting into an oblique position in the profile as soon as the clamping element is inserted into receiving space 14. Elevation 55 preferably projects less than 3.5 mm, whereby a safe function of elevation 55 and an insertion of clamping element 18 into receiving space 14 without any problems is assured.

FIG. 5 shows clamping element 18 represented in FIGS. 3 and 4 with integrated actuation member 19, inserted leaf, spring 20 and spring element 52, which has the form of an annular spring here. Actuation member 19 projects through housing opening 44 in housing 42 as well as through an opening 58 in leaf spring element 20 into cavity 46 formed in the housing bottom. Opening 58 in leaf spring element 20 is circular, but has, on one side, a form that differs from the circular contour, which is better visible in FIG. 7. Herein, a shoulder 60 is formed along a secant, the function of which will be explained in more detail in the following. By means of spring element 52, which is held on spring thorn 50 and guided through this one and a cylindrical recess 61 provided in actuation member 19, actuation member 19 is pushed away from cavity 46 in the housing bottom and projects beyond housing 42 with a portion 62. However, actuation member 19 can be immersed in housing 42 by pressing it in against the spring resistance of spring element 52, such that clamping element 18 can be inserted into receiving space 14 of element 12 and joined by means of the spring-weighed actuation member 19, which snaps in a corresponding opening in receiving space 14 with its portion 62 that projects beyond housing 42. During such a pressing in, actuation member 19 having a shoulder edge 64 formed thereon, which is visible in FIG. 11, leans with this edge on a shoulder 60, which is formed in opening 58 of leaf spring element 20. On the one hand, this causes leaf spring element 20 to follow the pressing in motion and not to work loose from a functional structure formed on actuation member 19 in form of an eccentric 66, which is represented in FIG. 12. On the other hand, a tilting motion of actuation member 19 is prevented. Furthermore, one can see the guiding and expanding pin 56, which traverses leaf spring element 20 in the proximity of anchor elements 22. Guiding and expanding pin 56 is guided through a through hole 68 of leaf spring element 20 and inserted in through holes 54 of housing 42 of clamping element 18, such that leaf spring element 20 is held in housing 42 by means of actuation member 19 and guiding and expanding pin 56. Guiding and expanding pin 56 extends through said through holes 54 provided in housing 42 of clamping element 18. Due to this positive fit fixation and the non-positive fit fixation by means of said elevations 55 of housing 42 of clamping element 18, which press against corresponding surfaces of adapter element 16, a play free junction between clamping element 18 and adapter element 16 is achieved.

Figure 6:
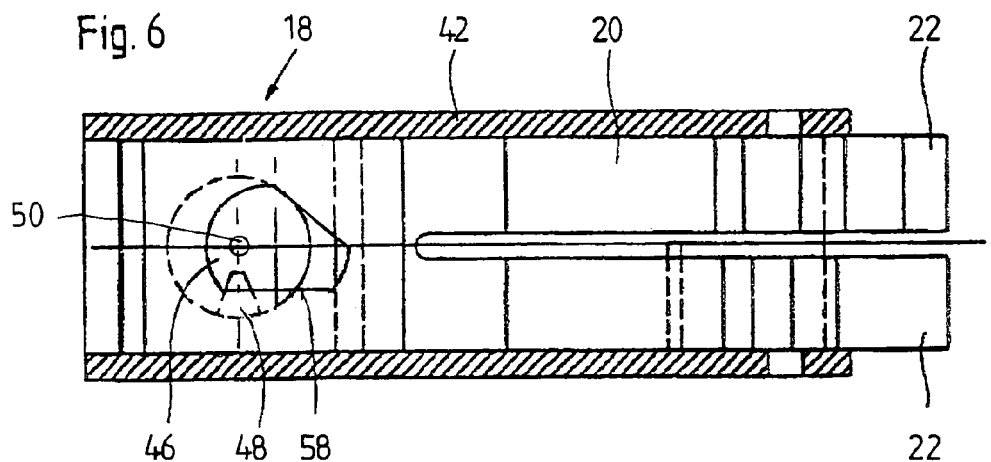
FIG. 6 shows the clamping element according to FIG. 4 with inserted leaf spring element.

For a better comprehension, FIG. 6 shows a cut plan view of clamping element 18 with inserted leaf spring element 20.

Figure 7:
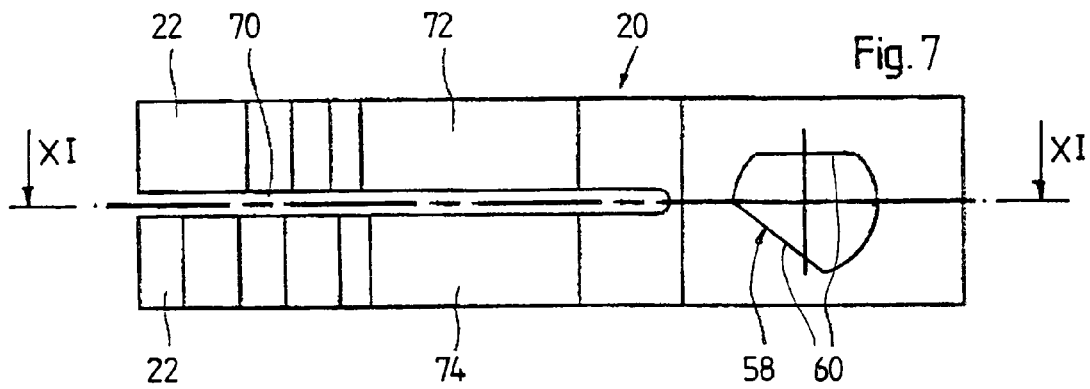
FIG. 7 shows a plan view of the leaf spring element according to FIG. 1.
Figure 8:
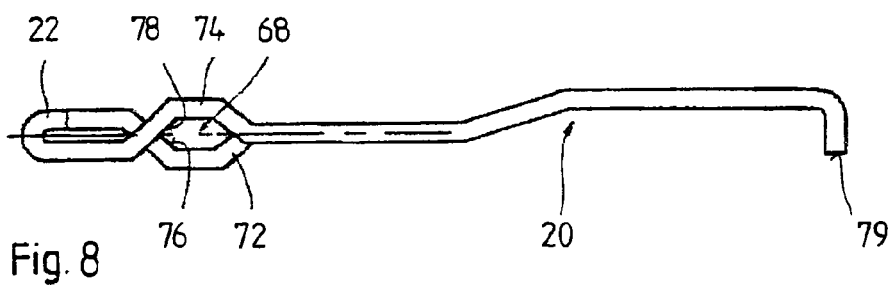
FIG. 8 shows a side view of the leaf spring element according to FIG. 7.
Figure 9:
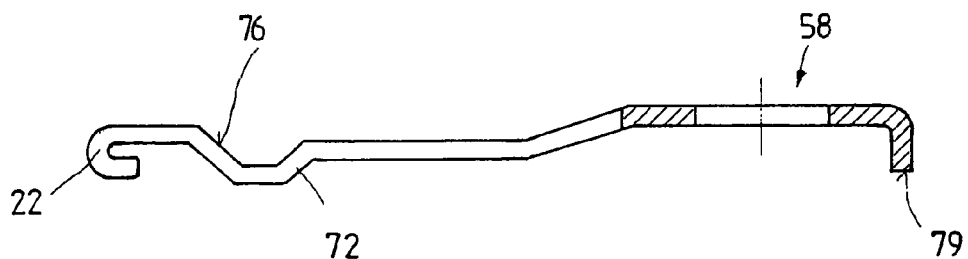
FIG. 9 shows a sectional view of the leaf spring element along the cutting line XI-XI in FIG. 7.

FIGS. 7 through 9 show leaf spring element 20 in greater details, wherein leaf spring element 20 has been turned by 180° in the plane of projection with respect to the plan view of FIG. 6. Starting from that side of leaf spring element 20, on which anchor elements 22 are formed, a longitudinal slot 70 extends into leaf spring element 20, which slot divides leaf spring element 20 on this side into two spring arms 72 and 74. In the side of leaf spring element 20, which is opposite to anchor elements 22, said opening 58 is provided, which cooperates with actuation member 19 for actuating leaf spring element 20. In the side view of leaf spring element 20 in FIG. 6 it is visible that the two spring arms 72 and 74 form passage 68 by inversely directed U-bendings. As shown in FIG. 5, guiding and expanding pin 56 is guided through this passage 68 in the mounting state. On the side of the anchor elements, the two spring arms 72 and 74 respectively comprise stop slopes 76 and 78, which, in case of a tensile motion of leaf spring element 20 in the direction of the end of leaf spring element 20 that is opposite to anchor elements 22, cooperate with guiding and expanding pin 56, which is fixed in the housing, such that said anchor elements 22 also realize an expanding motion, apart from the tensile motion. This combined tensile and expanding motion finally causes the clamping of anchor elements 22 in an undercut longitudinal groove of an adjacent element, with which said element 12, in which clamping joint system 10 is integrated, shall be joined.

Furthermore, the form of opening 58 in leaf spring element 20 is visible in FIG. 7. Said opening 58 is essentially circular and has two shoulders 60 differing from the regular circular periphery, which shoulders interrupt the circular contour of opening 58 essentially like secants. These shoulders 60 serve as support areas for portion 66 of actuation member 19, which works as eccentric, and prevent torsion of leaf spring 20 inside clamping element 18 during an actuation of actuation member 19. Leaf spring 20 further comprises a support surface 79, as shown in FIGS. 8 and 9, with which the leaf leans against a surface of clamping element 18 or optionally against a surface of receiving space 14 of element 12, whereby leaf spring 20 is additionally protected against turning.

Figure 10:
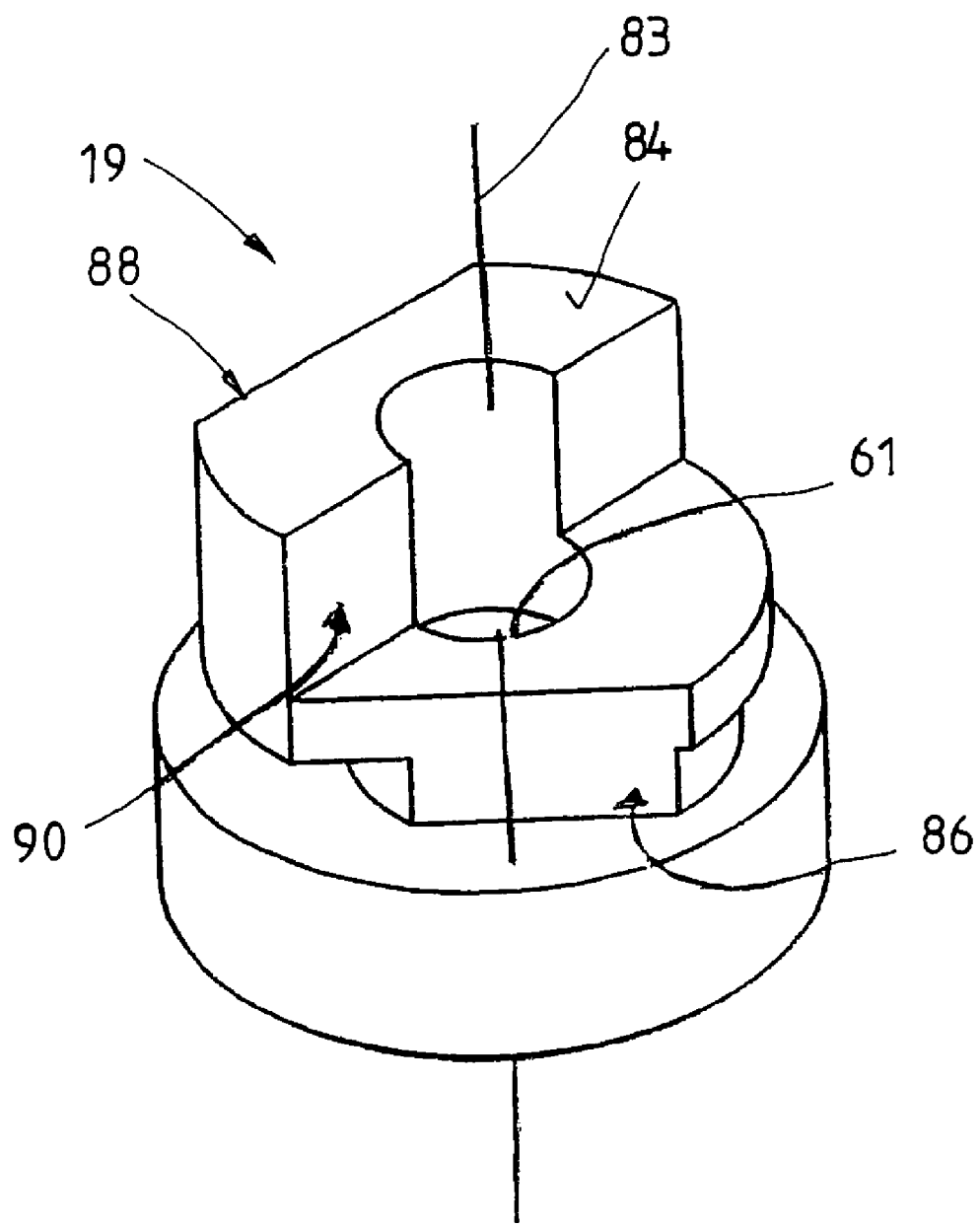
FIG. 10 shows a perspective view of the actuation member of the clamping element represented in FIG. 5.

FIG. 10 is a perspective view of actuation member 19. Actuation member 19 is made of one single piece and comprises, seen from below to above in FIG. 10, a head section 80, a section 30 formed as eccentric, a transition section 82 and a section 84 serving as stop. Head section 80 comprises a circular cross section. Portion 66, which serves as eccentric, is located off-centre with respect to the main axis 83 of actuation member 19 and also comprises an essentially circular cross section with smaller diameter than head section 80, wherein a shoulder 86 is formed along a secant. Portion 66, which serves as eccentric, cooperates with opening 58 of said leaf spring element 20 for the actuation of anchor elements 22 of said leaf spring element 20. Transition section 82 essentially presents the same outer contour as opening 58 of said leaf spring element 20 and can be guided through this one. Section 84 of actuation member 19, which serves as stop, comprises two stop faces 88 and 90, which cooperate with stop 48 provided in cavity 46 of said housing 42, in order to limit the rotation of actuation member 19 in both directions. Stop faces 88 and 90 are formed such that they cooperate in a plane way with the stop faces of stop 48 in the respective stop positions. The cylindrical recess 61, which serves for receiving and guiding spring element 52, extends through section 84 serving as stop and through transition section 82.

Figure 11:
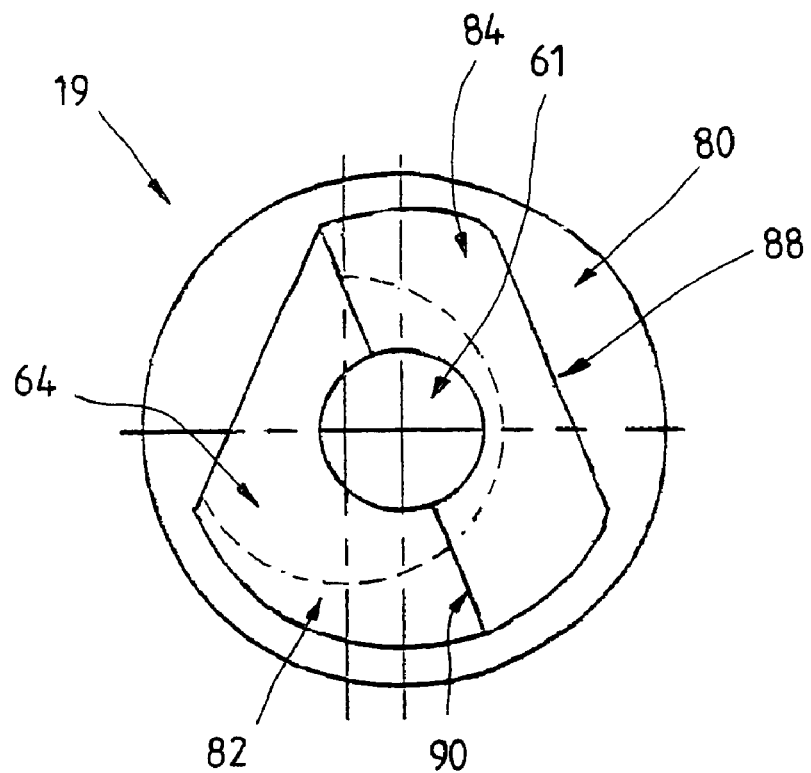
FIG. 11 shows a plan view of the actuation member according to FIG. 10.
Figure 12:
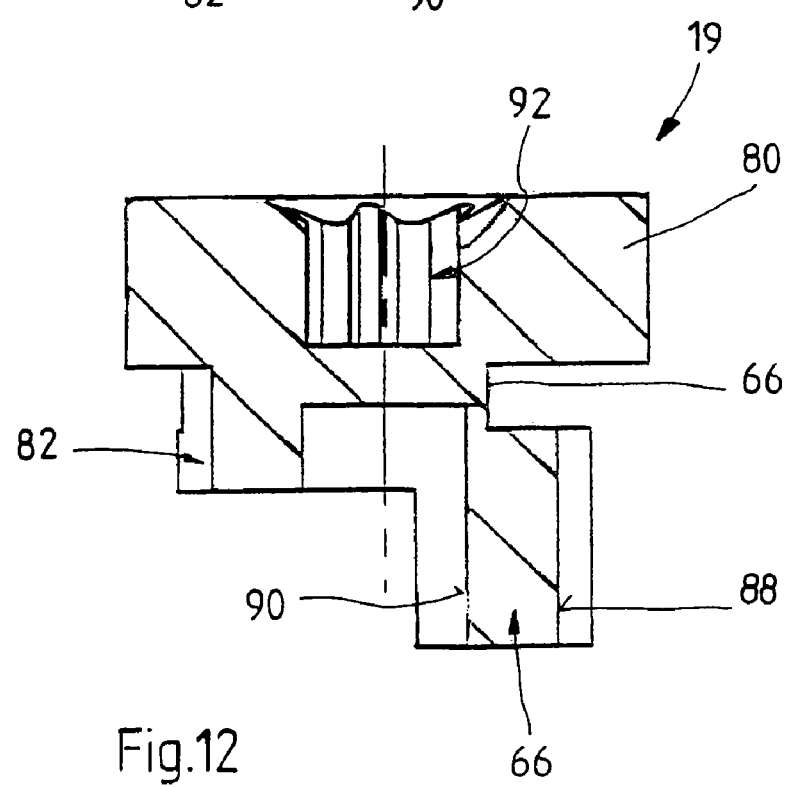
FIG. 12 shows a side view of the actuation member represented in FIGS. 10 and 11.

FIGS. 11 and 12 show other views of actuation member 19, wherein FIG. 11 is a view from below and FIG. 12 is a side view. The dashed line represented in FIG. 11 shows portion 66, which serves as eccentric and is hidden in this view. As it is visible in FIG. 12, actuation member 19 further comprises a tool engagement structure 92 for receiving a spanner.

It is to be understood that the above described exemplary embodiment is not limiting and that variations and modifications are possible without leaving the protected scope, which is defined by the annexed claims.

What is claimed is:

1. A clamping joint system for detachably connecting two elements, at least one of the two elements comprises an undercut longitudinal groove and the other one of the two elements comprises a receiving space formed therein, said clamping joint system comprising:

a clamping element, which can be inserted into said receiving space and which includes a housing and anchor elements which are received in said housing and can be clamped against the undercut of the longitudinal groove by actuating an actuation member which projects through an opening of said housing, and wherein:

an outermost surface of said housing of said clamping element has an elevation which projects outwardly from the outermost surface and diametrically opposite the actuation member, said elevation providing a tolerance compensation between said housing and a surface of said receiving space when said clamping element is inserted in said receiving space, so that misalignment of the clamping element with the actuation member is minimized.

2. A clamping joint system according to claim 1 wherein said elevation projects less than 3.5 mm from the surrounding outer surface of said housing of said clamping element.

3. A clamping joint system according to claim 1 further comprising a leaf spring element placed in said housing of said clamping element, said leaf spring element including said anchor elements and an essentially circular opening for passing through said actuation member, said opening, along the periphery thereof, having at least one shoulder.

4. A clamping joint system according to claim 3 wherein said actuation member comprises a portion serving as eccentric that, when said leaf spring element and said actuation member are mounted, cooperates with the peripheral contour of said opening of said leaf spring element, if said actuation member makes a rotational movement.

5. A clamping joint system according to claim 4, wherein said opening of said leaf spring element comprises, along the periphery thereof, several shoulders differing from the regular contour, which form support areas for said portion of said actuation member serving as an eccentric, and which prevent turning of said leaf spring element inside said clamping element during actuation of said actuation member.

6. A clamping joint system according to claim 3 wherein said actuation member comprises a structure, which essentially corresponds to said shoulder at a portion that passes through said opening of said leaf spring element.

7. A clamping joint system according to claim 3 wherein a stop is provided at said clamping element, which stop cooperates with a shoulder of said actuation member serving as stop, and limits the rotation of said actuation member in both directions.

8. A clamping joint system according to claim 7, wherein the stop faces of said stop and of said shoulder serving as stop of said actuation element are formed such that they are essentially facing each other in parallel in the corresponding stop position.

9. A clamping joint system according to claim 1 wherein said actuation member is spring-weighed by means of a spring element.

10. A clamping joint system according to claim 9, characterized in that said spring element is held at a spring element holding device provided at said clamping element.

11. A clamping joint system according to claim 9 wherein said spring element is received in an essentially cylindrical recess of said actuation member.

12. A clamping joint system according to claim 1, wherein said housing has a thickness between a part of said bottom area of said cavity portion and said outer surface smaller than a thickness of said housing surrounding said cavity portion.

13. A clamping element for a clamping joint system, the clamping element comprising:

a housing including first and second sides opposing each other, said first side having an opening extending therethrough, said second side having a cavity portion formed on an inside surface thereof opposite said housing opening, said second side further having an elevated portion extending outwardly from an outermost surface thereof, said elevated portion being located opposite a bottom area of said cavity portion;

a leaf spring element disposed within said housing between said first and second sides; and an actuation member configured to extend through said housing opening and engage with said cavity portion of said housing and said leaf spring element, wherein said elevated portion projects outwardly diametrically opposite the actuation member, said elevated portion providing a tolerance compensation between said housing and a surface of said receiving space when said clamping element is inserted in said receiving space, so that misalignment of the clamping element with the actuation member is minimized.

14. The clamping element of claim 13, wherein said elevated portion extends outwardly less than 3.5 mm from said outer surface of said second side.

15. The clamping element of claim 13, wherein said leaf spring element includes anchor elements disposed on an end thereof, said leaf spring element further including an essentially circular opening extending therethrough, said opening defining a periphery and having at least one shoulder along said periphery, said actuation member being configured to extend through said opening.

16. The clamping element of claim 13, wherein said housing has a thickness between a part of said bottom area of said cavity portion and said outer surface smaller than a thickness of said housing surrounding said cavity portion.

17. A clamping joint system for detachably connecting two elements, the first element having an undercut longitudinal groove and the second element having a receiving space formed therein, said clamping joint system comprising:

a clamping element, which can be inserted into said receiving space; the clamping element including an elongated hollow housing having a major axis and anchor elements, the anchor elements extending from one end of the housing and adapted to be clamped against the undercut of the longitudinal groove by actuating an actuation member, the housing having an opening for receiving an outer portion of the actuator member therein, the housing further having a wall of a given thickness defining a cavity for receiving an inner portion of the actuator member so that the actuator member extends obliquely to the major axis of the housing, said cavity being located diametrically opposite the opening and adjacent an opposite end of the housing from the end at which the anchor elements extend, an outermost surface of said housing having an elevation projecting outwardly beneath the cavity, said elevation being formed such that it provides a tolerance compensation between said housing and a surface of said receiving space in the second element when said clamping element is inserted in said receiving space.

18. The clamping system of claim 1 wherein peripheral portions of the elevation are joined to the housing by wall portions having a thickness less than the thickness of the housing wall that defines the cavity.

* * * * *